United States Patent [19]

Crosa

[11] 3,958,318

[45] *May 25, 1976

[54] FASTENER APPLYING TOOL

[75] Inventor: Valentin L. Crosa, Montevideo, Uruguay

[73] Assignee: H. K. Porter Co., Pittsburgh, Pa.

[ * ] Notice: The portion of the term of this patent subsequent to Mar. 25, 1992, has been disclaimed.

[22] Filed: Feb. 5, 1975

[21] Appl. No.: 547,420

Related U.S. Application Data

[63] Continuation of Ser. No. 412,131, Nov. 13, 1973, Pat. No. 3,872,570.

[30] Foreign Application Priority Data

Nov. 13, 1972 Uruguay .................................. 19154

[52] U.S. Cl. .................................... 29/267; 29/283; 81/3 H

[51] Int. Cl.$^2$ .......................................... B23P 19/04

[58] Field of Search ...................... 29/267, 268, 283; 81/5.1 R, 3 E, 3 H

[56] References Cited

UNITED STATES PATENTS 3,872,570 3/1975 Crosa .................................. 29/267

*Primary Examiner*—James L. Jones, Jr.
*Attorney, Agent, or Firm*—Ladas, Parry, Von Gehr, Goldsmith & Deschamps

[57] ABSTRACT

A tool for applying a fastener having rod engaging tongues to a rod comprising a support tube; a rod clamping assembly mounted in said, and movable longitudinally relative to said tube; a lever arrangement pivotally connected to said assembly for producing said relative movement; a release projection mounted in said tube and adapted to cooperate with said clamping assembly to release a said rod when gripped thereby; and a spring biasing said clamping assembly, in the direction opposite to said relative movement, into cooperation with said release projection; said tube being adapted to cooperate with a said fastener and, upon operation of said lever arrangement to produce said relative motion, to move said fastener along a said rod when engaged by said clamping assembly.

9 Claims, 6 Drawing Figures

FASTENER APPLYING TOOL

This is a continuation of application Ser. No. 412,131 filed Nov. 13, 1973, now U.S. Pat. No. 3,872,570.

This invention relates to a tool for applying fasteners, and particularly though not exclusively, to a tool for applying fasteners such as those described in U.S. patent application Ser. No. 197,017, filed Nov. 9, 1971, by the applicant of the present application.

It is a primary object of the present invention to provide a tool which facilitates application of fasteners, such as those described in the aforementioned application, to rod members for the purpose of utilizing the fastener and rod member to clamp one or more members to one or more other members.

According to the invention there is provided a fastener applying tool for applying a fastener having rod engaging tongues to a rod comprising:

a support structure;

a rod clamping assembly mounted to said structure and movable relative to said structure;

means for producing said relative movement;

A release means mounted to said structure and adapted to cooperate with said clamping assembly to release a said rod when gripped thereby; and means biasing said clamping assembly, in the direction opposite to said relative movement, into cooperation with said release means; wherein said structure is adapted to cooperate with a said fastener and, upon operation of said means to produce said relative motion, to move said fastener along a said rod when engaged by said clamping assembly.

The tool of the present invention is useful, for example, for applying fasteners such as the aforementioned fasteners to mounting rods in the construction of roofs in which corrugated sheets are clamped to framework.

By way of example the rod member referred to above may comprise a length of rod bent to form a hook at one end so that it will engage a frame member and the fastener may comprise a disc ke member having an annular portion inwardly and axially from which project a plurality of tongues dimensioned to engage the periphery of the rod member in such manner as to slide readily on the rod only in one direction, whereby on application of the fastener to the rod the fastener and rod may be used to clamp a corrugated or other roofing sheet to said frame member.

It will be appreciated that the tool of the present invention is in no way restricted to use in the construction of roofs and it will be readily apparent that the tool is useful for applying the aforementioned fasteners in a wide range of situations arising, a wide range of industries, technologies and environments.

A preferred embodiment of a tool according to the invention will now be described, by way of example, with reference to the accompl[nying drawings, in which.

Figure 1:
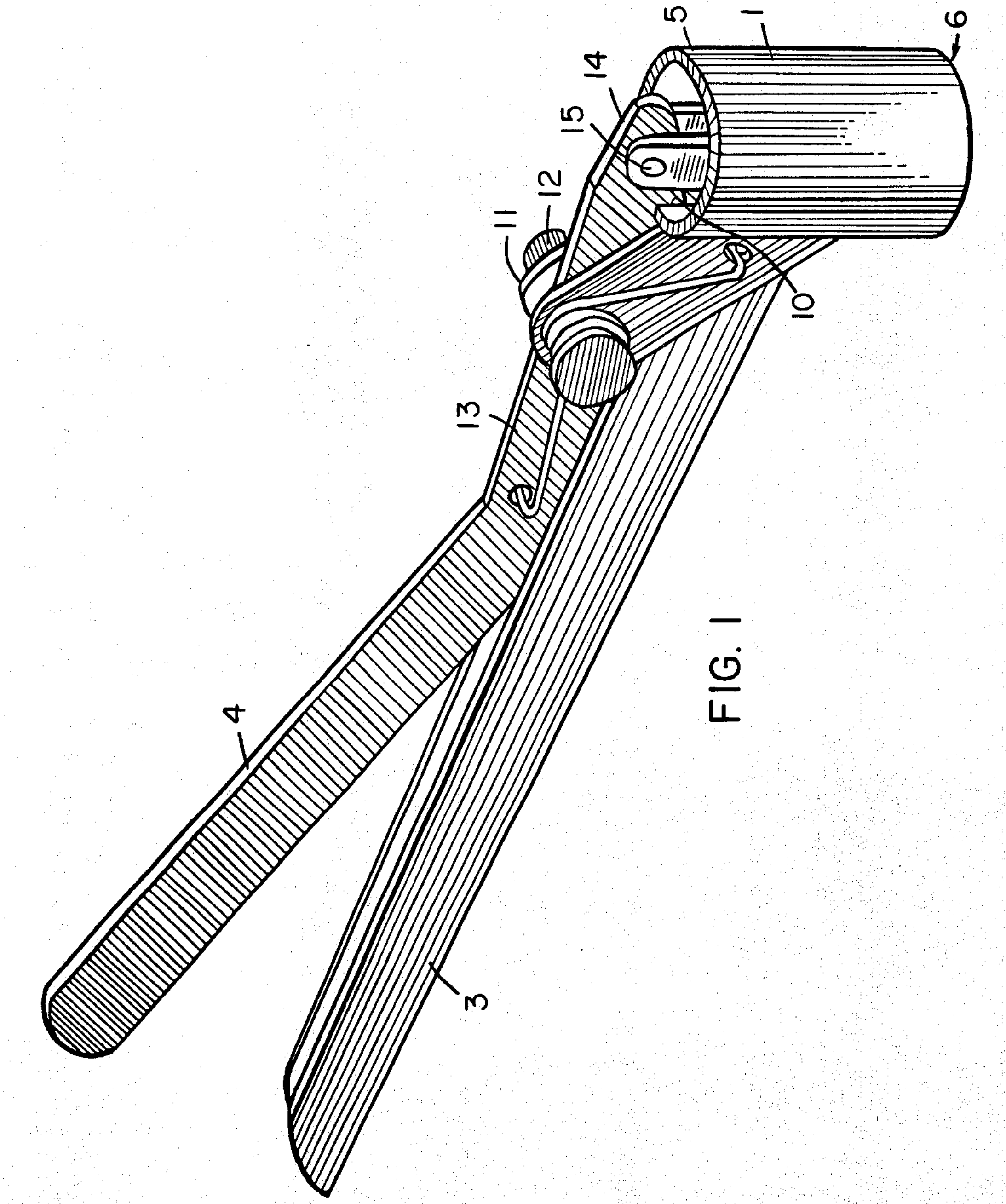
FIG. 1 is a perspective view.

The tool shown in the drawings comprises a tubular cylindrical housing, a clamping assembly 2 housed within the cylindrical housing, a handle 3 projecting from the cyclindrical housing normal to its longitudinal axis and a pivoted lever 4 pivotally mounted to the cylindrical housing and pivotally connected to the clamping assembly 2 for operation thereof.

The cylindrical housing is open at its upper end 5 and closed at its lower end 6 with the exception of a central opening 7 having a diameter to accommodate a rod member 8, forming part of the fastening system in connection with which the tool is to be used, and a downwardly opening countersink of sufficient size to accommodate tongues of a fastener 9, to be utilized in conjunction with the rod member to produce the fastening assembly. The upper end 5 of the cylindrical housing has a longitudinally extending slot 10 in the periphery of the housing to accommodate motion of the lever 4. The handle 3 is rigidly attached to the periphery of the cylindrical housing and is in alignment with the slot 10.

Rigidly mounted on the cylindrical housing 1 adjacent to handle 3 and projecting in the same general direction as the handle 3 is a pivot support 11 to which is pivotally mounted the lever 4 by means of a pivot pin 12. A coil spring 13 is disposed under tension about the pivot pin and has its ends connected respectively to the lever 4 and pivot support 11 so as to bias the lever 4 away from the handle 3. The handle 3 is of a U-shaped cross-section to accommodate the lever 4 when the lever is moved against the bias of the spring to operate the clamping assembly 2. The handle 3 and lever 4 are spaced apart a distance which facilitates the gripping of these members by a human hand in such manner that the gripping action of the hand will operate the tool.

End 14 of of the lever projects into the upper end 5 of the cylindrical housing 1 through the slot 10 and is pivotally connected by a pivot pin 15 to the clamping assembly 2.

Figure 3:
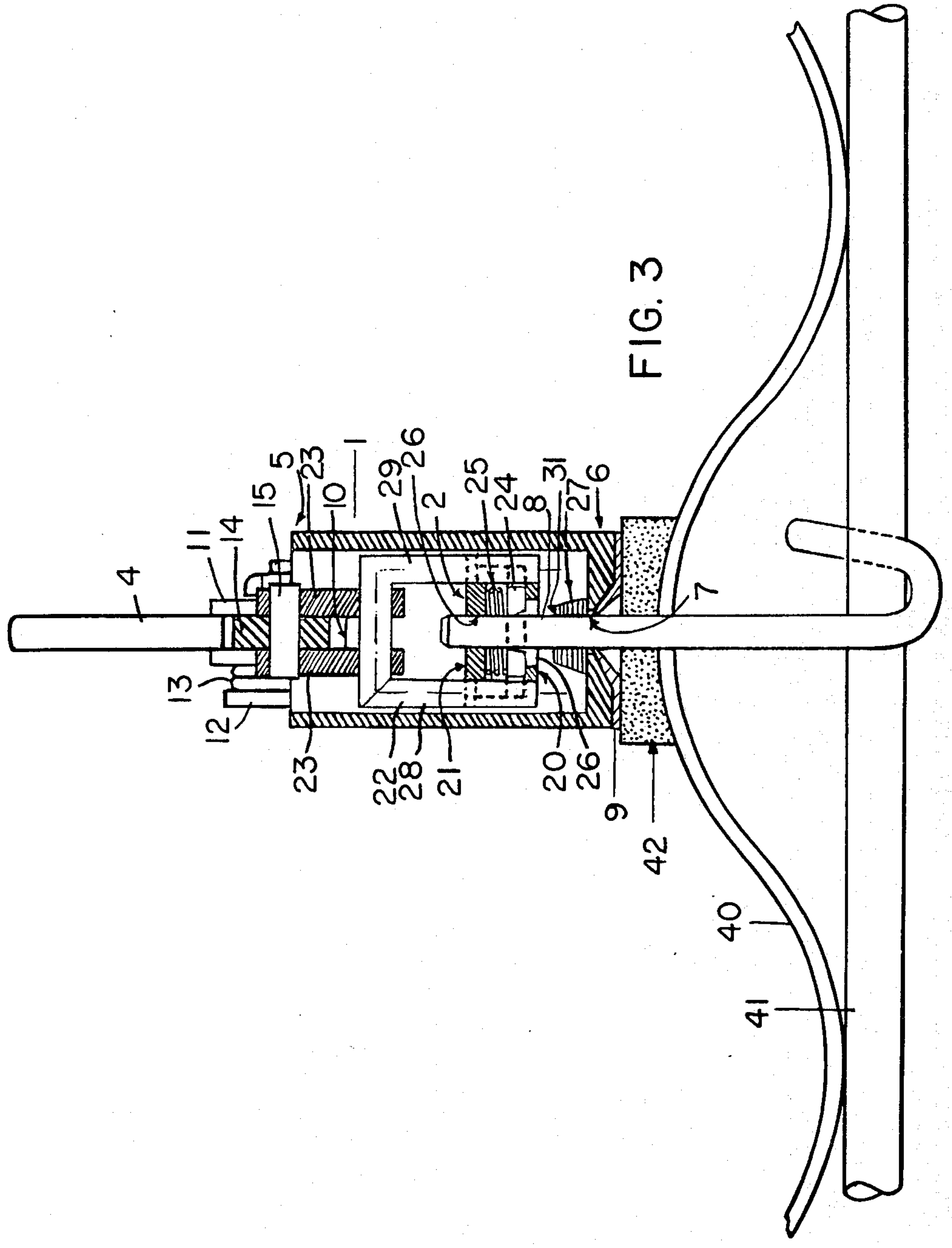
FIG. 3 is a sectioned end elevation along section line 3—B3 of FIG. 1 with the tool shown in the process of applying a fastener to a rod member.
Figure 4:
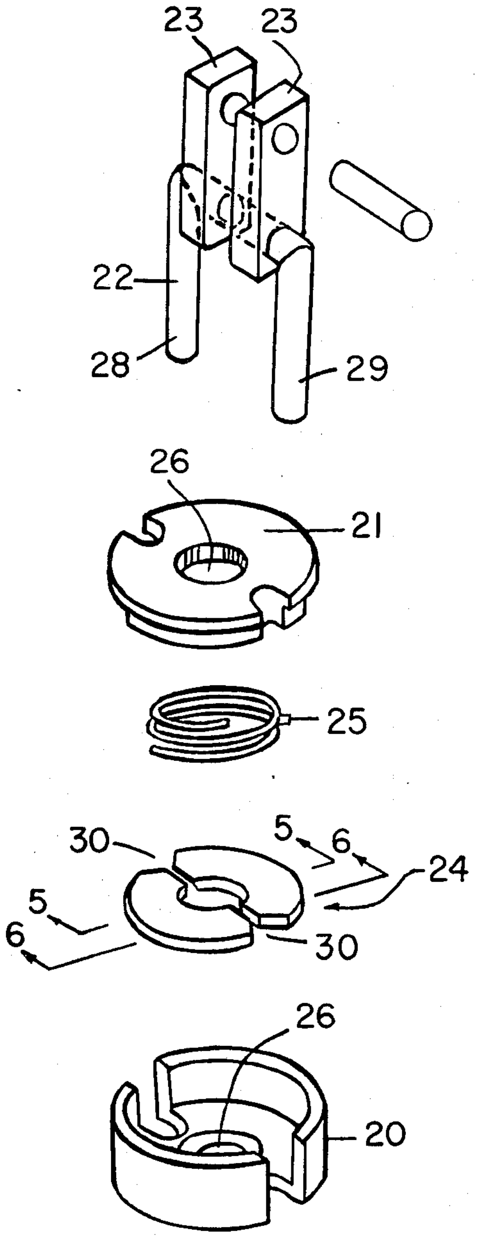
FIG. 4 is an exploded view of the interior construction of a rod engaging portion of the tool.

The clamping assembly may best be seen by reference to FIGS. 3 and 4, which, respectively, show a sectional elevation and an exploded view of the clamping assembly. The clamping assembly comprises a lower cup shaped member 20, a cap 21, a U-shaped yoke 22, two links 23, a split clamp washer 24, and a coil spring 25.

The cup 20, cap 21, and yoke 22 are welded together to form a hollow cylindrical member the ends of which are closed with the exception of aligned openings 26, located on the longitudinal axis of the cylindrical member, of a diameter to permit said rod member 8 to project longitudinally through the cylindrical member. The opening 26 in cup 20 is larger in diameter than is required merely to permit projection of the rod member 8 therethrough and is of sufficient diameter to permit entry of a release member 27, which is mounted on the inside of the lower end 6 about the central opening 7, into the cup shaped member 20.

Housed within the cylindrical member is the split washer 24 and the coil spring 25. The coil spring 25 is disposed between the cap 21 and the split clamp washer 24 to bias the split clamp washer 24 down into the cup-shaped member 20.

Figure 6:
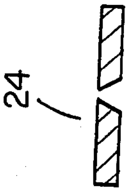
FIG. 6 is a sectional elevation taken on section line 6—6 of FIG. 4.
Figure 5:
FIG. 5 is a sectional elevation taken on section line 5—5 of FIG. 4.
Figure 2:
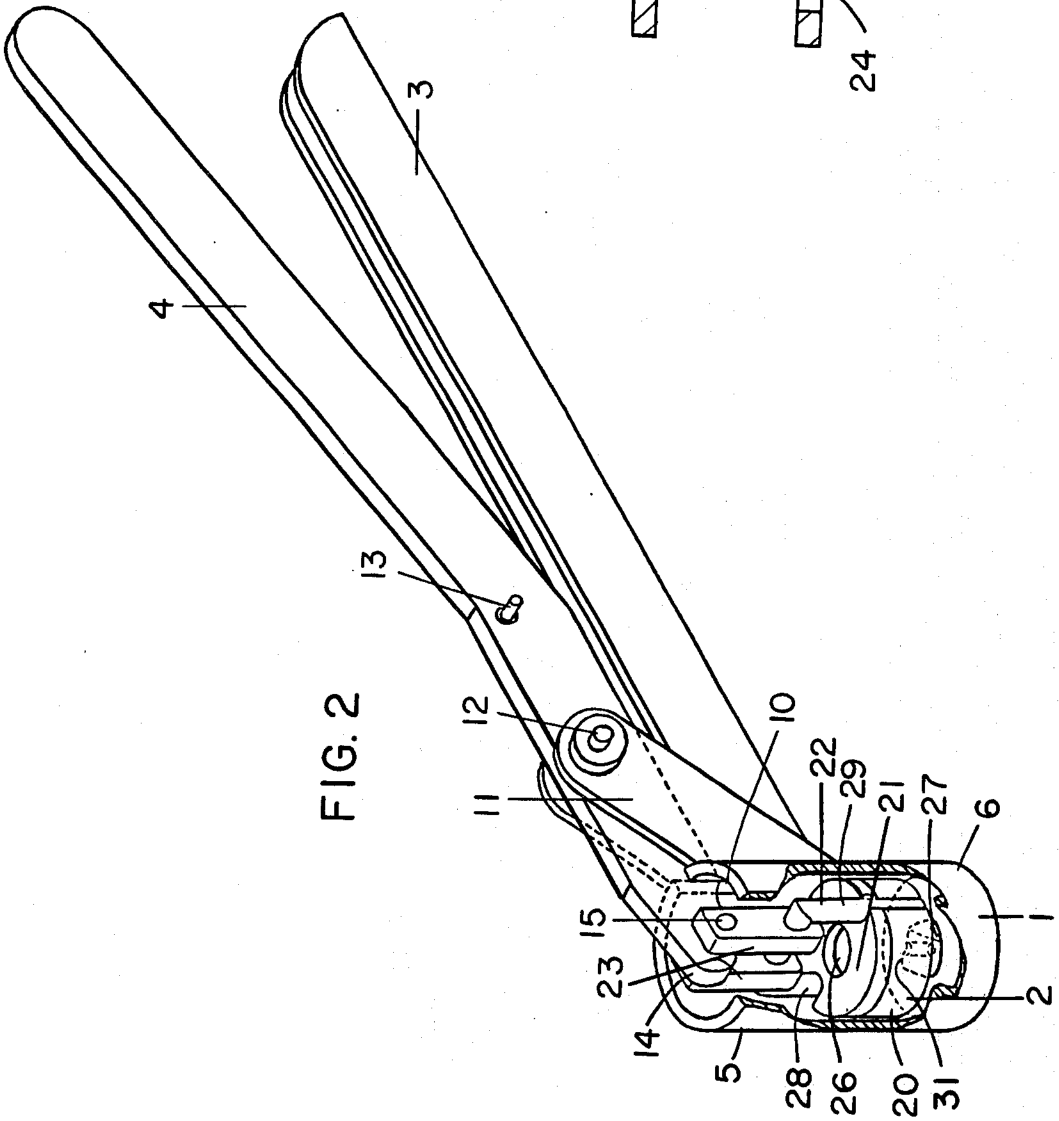
FIG. 2 is a partly sectioned perspective view.

The split clamp washer 24 comprises a pair of like substantially semi-circular members of cross-sectional form as shown in FIGS. 5 and 6 which when together to form the split clamp washer 24 provide a central bore dimensioned to engage the periphery of said rod member 8 and the external diameter of which is dimensioned to engage the interior cylindrical periphery of the cup-shaped member 20 when the split clamp washer engages the periphery of the rod member 8. The bore defined by the two parts of the split clamp washer 24 is, when the periphery of the split clamp washer engages the interior periphery of the cup-shaped member 20, slightly smaller in diameter than the exterior of a rod member 8 with which the tool is intended to operate. In addition this bore of the split clamp washer is of slightly tapered form in order that the diameter of the bore is smaller on the side of the split clamp washer adjacent the coil spring 25. The shape and dimensions of the split clamp washer produce an interference fit of the two parts of split clamp washer between a rod member 8 disposed therebetween and the interior periphery of the cup-shaped member 20 thereby to cause said grip of the periphery of a rod-shaped member. The adjacent diametrically extending faces of the split clamp washer 24 taper away from one another to facilitate entry of the release member 27 therebetween when this member 27 projects through the opening 26 in the cup-shaped member 20.

Legs 28 of the yoke 22 extend along the periphery of the cylindrical member formed by the cup-shaped member 20 and cap 26, are welded thereto and project inwardly along the internal periphery of the cup-shaped member 20 to engage cutouts 30 in the split clamp washer 24. This engagement results in the split clamp washer 24 being confined to alignment with the yoke and consequently to a fixed orientation inside the cylindrical housing 1 as a result of the control of orientation provided by pivotal attachment of links 23 to the lever end 24 by means of the pivot pin 15.

The release member 27 is attached concentrically about said opening 7 to the inside of the lower end of the tubular cylindrical housing 1, projects inwardly along the longitudinal axis of the tubular cylindrical housing 1, and has an end in the form of a transverse ridge 31. A bore sufficient to permit the projection of rod member 8 therethrough extends longitudinally through the center of the release member 27 coaxially with opening 7. The dimensions of the release member 27 are such as to permit the release member to project through the opening in the center of the cup-shaped member 20 so that the ridge 30 will enter into the gap between said adjacent diametric faces of the split clamp washer when the clamping assembly is in a position closely adjacent the lower end of the tubular cylindrical housing 1. This entry of the ridge 31 into the space between the diametric adjacent faces of the split clamp washer 24 causes the two parts of the split clamp washer 24 to be moved slightly apart thereby to release a rod member 8 engage by the split clamp washer 24.

Operation of the tool described in relation to the drawings will now be described and in this respect attention is particularly drawn to FIG. 3 in which the tool is shown in the process of clamping a corrugated sheet 40 to a roofing member 41 by means of a fastener assembly comprising rod member 8 and fastener 9. Fastener 9 is of the type generally described in the introduction to this specification.

The hook member 8 is hooked around roof member 41 and the straight shank of the rod member is passed through a hole in the corrugated sheet. A "neoprene" seal 42 is placed around the rod above the corrugated sheet and fastener 9 is placed on the free end of the rod member and slid partially down the rod member.

The tool of the present invention is then positioned so that the free end of the rod member 8 passes through the central opening at the lower end of the tubular cylindrical housing, the bore in the release member 27, the lower opening of the cup-shaped member 20 and through the central bore defined by the split clamp washer 24. The split clamp washer 24 is displaced against the bias provided by the coil spring 25 to facilitate easy passage of the end of the rod member between the two parts of the split clamp washer.

With the tool in this position the handle and lever are moved toward one another thereby moving the clamping assembly through the tubular cylindrical housing longitudinally of the rod member 8 with the result that the split clamp washer 24 under the biasing influence of the coil spring, and by virtue of its contact with the rod member is urged down into the cup-shaped member 20 thereby, by virtue of the fit of the split clamp washer within the cup-shaped member 20 and the fact that the bore defined by the split clamp washer is slightly smaller than the diameter of the rod member 8, gripping the rod member 8 so that the tubular cylindrical housing 1 is moved longitudinally of the rod member 8, toward the sheet 40, carrying with it the fastener 9. This process is continued until the fastener 9, in combination with the hook of the rod member 8, securely clamps the sheet member 40 to the roof member 41. To release the tool from the rod member 8 the lever and handle are released to allow the spring 13 to move, by way of the lever 4, the clamping assembly 2 into a position where it is adjacent the lower end of the cylindrical housing 1 thereby to cause the ridge 31 of the release member 27 to enter between the adjacent diametric faces of the two parts of the split clamp washer 24 to move the split clamp washer upwardly and outwardly away from the rod member 8 against the bias of the coil spring 25 to release the rod member 8 and permit removal of the tool therefrom.

It will be appreciated that although the preferred embodiment described in this specification is a manually operated tool the inventive concept with which this invention is concerned could readily be adapted for operation by pnuematic, hydraulic or electrical power and that such alternative embodiments fall within the scope of the present invention.

I claim:

1. A tool for releasably gripping a rod comprising:

a support structure;

a rod clamping assembly connected to said structure and movable relative to said structure;

means for producing said relative movement; and a release means connected to said structure and adapted to cooperate with said clamping assembly, when said clamping assembly and said structure are at one end of said relative movement, to release a said rod gripped by said clamping means;

wherein, upon operation of said means to produce said relative motion, away from said one end, a said rod, when gripped by said clamping assembly, is moved longitudinally relative to said structure; wherein the clamping assembly comprises:

a housing having an opening permitting projection of a said rod into said housing;

a split clamp means captively disposed in said housing and defining a rod engaging opening; and a resilient means to bias said split clamp means into engagement with a said rod projecting through said rod engaging opening; whereby said split clamp means is in an interference fit between said housing and said rod and said rod is gripped by said clamping assembly.

2. A tool for applying a fastener having rod engaging tongues to a rod comprising:

a support structure;

a rod clamping assembly connected to said structure and movable relative to said structure;

means for producing said relative movement;

a release means connected to said structure and adapted to cooperate with said clamping assembly to release a said rod when gripped thereby; and means for biasing said clamping assembly, in opposition to said relative movement, into cooperation with said release means; wherein said structure is adapted to cooperate with a said fastener and, upon operation of said means to produce said relative motion, to move said fastener along a said rod when engaged by said clamping assembly, wherein the clamping assembly comprises:

a housing having a base portion, opposed wall portions projecting from said base portion and an opening in said base portion permitting projection of a said rod into said housing centrally between said wall portions, a split clamp member captively disposed between said wall portions and defining a rod engaging opening; and a resilient means to bias said split clamp member toward said base portion; wherein when a said rod projects through said opening in said base portion and said rod engaging opening, said split clamp member is in an interference fit between said wall portions and said rod whereby said rod is gripped by said clamping assembly.

3. A tool according to claim 2, wherein said split clamp member is displaceable away from said base portion against the bias of said resilient means by a said rod and by said release means to facilitate passage of a said rod into and out of said clamping assembly.

4. A tool according to claim 2, wherein said opening in said base portion also permits projection of said release means therethrough into cooperation with said split clamp member to release a said rod when gripped by said split clamp member.

5. A tool according to claim 4, wherein said release means has a ridge adapted to extend into the split of said split clamp member to simultaneously open said split and move said split clamp member against the bias of said resilient means.

6. A tool according to claim 5, wherein:

said support structure is a cylindrical tube closed at one end except for an opening permitting the projection of a said rod into said structure;

said rod clamping assemlby is mounted within said tube for movement relative thereto along the longitudinal axis thereof;

said housing is in the form of a circular cup with the bottom of said cup forming the base portion and the peripheral wall of said cup forming the opposed wall portions;

said split clamp member is a substantially circular clamp washer constructed of two like substantially semi-circular parts which together define said rod engaging opening; and said release means is a projection attached to the closed end of said tube, having a rod opening coaxial with said opening in said closed end and being adapted to project through said opening in said base portion into the split between said parts of said split clamp member.

7. A tool according to claim 6, comprising;

a handle projecting from said tube;

a lever pivotally connected to said tube;

a pivotal connection between said rod clamp assembly and one end of said lever; and wherein said means biasing said clamping assemlby comprises;

a spring connected to said lever and said tube to bias said rod clamping assembly into cooperation with said release means.

8. A tool according to claim 6, wherein the split between said parts is of tapered cross-section to facilitate entry of said release means into said split.

9. A tool according to claim 6, wherein said rod engaging opening is frusto-conical in form to facilitate passage of a said rod into said opening to provide an acute angle lip to facilitate gripping of said rod on operation of the tool.

* * * * *